(12) United States Patent
Lin et al.

(10) Patent No.: US 10,505,462 B2
(45) Date of Patent: Dec. 10, 2019

(54) POWER CONVERTER

(71) Applicant: TDK CORPORATION, Tokyo (JP)

(72) Inventors: Min Lin, Tokyo (JP); Ken Matsuura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/228,006

(22) Filed: Dec. 20, 2018

(65) Prior Publication Data

US 2019/0199223 A1    Jun. 27, 2019

(30) Foreign Application Priority Data

Dec. 25, 2017   (JP) .................................. 2017-247535

(51) Int. Cl.
*H02M 3/335* (2006.01)
*H02M 1/08* (2006.01)
*H02M 1/00* (2006.01)

(52) U.S. Cl.
CPC ....... *H02M 3/33523* (2013.01); *H02M 1/083* (2013.01); *H02M 2001/0058* (2013.01)

(58) Field of Classification Search
CPC ............. H02M 3/335; H02M 3/33507; H02M 3/33523; H02M 2001/0058; H02M 2007/4815; H02M 2007/4822
See application file for complete search history.

(56) References Cited

U.S. PATENT DOCUMENTS

| 4,975,821 | A * | 12/1990 | Lethellier | H02M 3/33538 |
| | | | | 363/21.02 |
| 5,438,497 | A * | 8/1995 | Jain | H02M 3/337 |
| | | | | 363/132 |
| 9,130,467 | B2 * | 9/2015 | Hosotani | H02M 3/33569 |
| 9,660,536 | B2 * | 5/2017 | Hosotani | H02M 3/338 |
| 2013/0194831 | A1* | 8/2013 | Hu | H02M 3/33507 |
| | | | | 363/21.01 |

FOREIGN PATENT DOCUMENTS

| JP | 2017-508437 | 3/2017 |
| WO | 2015/138880 | 9/2015 |

* cited by examiner

*Primary Examiner* — Gary L Laxton
(74) *Attorney, Agent, or Firm* — Greenblum & Bernstein, P.L.C.

(57) ABSTRACT

A power converter includes: two DC input terminals that input a DC input voltage; two DC output terminals that output a DC output voltage; an isolation transformer with a primary winding and a secondary winding; a switch that is connected across the two DC input terminals in a state where the switch is connected in series to the primary winding and that switches the DC input voltage; an LC resonance circuit that includes an inductance and a capacitance and is connected in parallel to the primary winding; a first resonant capacitance that is connected in parallel to the switch; a second resonant capacitance that is connected in parallel to the secondary winding; and a rectifying and smoothing circuit that rectifies and smoothes a voltage generated across both ends of the second resonant capacitance and outputs as the DC output voltage across the two DC output terminals.

15 Claims, 5 Drawing Sheets

FIG. 9   RELATED ART ant clamp circuit 105.

POWER CONVERTER

FIELD OF THE INVENTION

The present invention relates to a power converter.

DESCRIPTION OF THE RELATED ART

An isolated resonant converter with high conversion efficiency is known as a power converter circuit that operates in a high frequency band (see Patent Literature 1 (Japanese Laid-open Patent Publication No. 2017-508437)).

Figure 9:
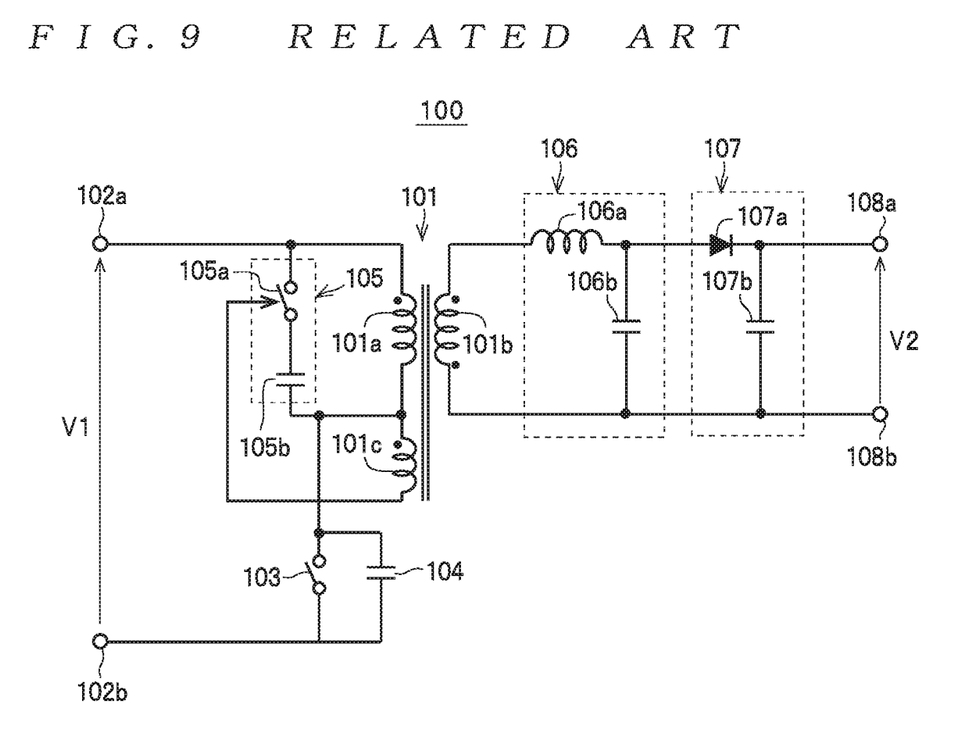
FIG. 9 is a diagram depicting a circuit configuration of an isolated resonant converter 100 as a conventional power converter.

As depicted in FIG. 9, the isolated resonant converter 100 disclosed in Patent Literature 1 includes a transformer 101 (or "isolation transformer") with a primary winding 101a, a secondary winding 101b, and an auxiliary winding 101c, a switch 103, which is disposed so as to be connected in series with the primary winding 101a between direct current (DC) input terminals 102a and 102b and switches a DC input voltage V1 inputted across the DC input terminals 102a and 102b, a resonant capacitor 104 connected in parallel to the switch 103, an active clamp circuit 105, an LC resonance circuit 106 (a series circuit composed of an inductance 106a and a capacitance 106b) connected in parallel to the secondary winding 101b, and a rectifying and smoothing circuit 107 (a circuit composed of a diode 107a as a rectifying element and a smoothing capacitor 107b) connected across both ends of the capacitance 106b. The isolated resonant converter 100 converts the DC input voltage V1 to a DC output voltage V2 which is outputted across DC output terminals 108a and 108b. The inductance 106a may be realized by only a leakage inductance present on the secondary winding 101b side of the transformer 101 or may be constructed by additionally disposing a separate inductance to the leakage inductance. Also, although not illustrated, since a leakage inductance of the transformer 101 also exists on the primary winding 101a side, it is also possible to use such leakage inductance as a resonant inductance.

In the isolated resonant converter 100, as one example, the active clamp circuit 105 is constructed of the auxiliary winding 101c and a switch 105a and a capacitance 105b that are connected in parallel to the primary winding 101a in a state where the switch 105a and the capacitance 105b are connected in series.

With the isolated resonant converter 100, when the switch 103 that drives the primary winding 101a of the transformer 101 is switched off, a resonant voltage is generated across both ends of the switch 103 due to the equivalent impedance that exists in parallel to the switch 103. Due to the switch 105a that constructs the active clamp circuit 105 becoming on when the switch 103 is off, the active clamp circuit 105 is capable of limiting the peak voltage value of this resonant voltage to a voltage value that is around double the input voltage, compared to a voltage value that is around 3.6 times the input voltage for a configuration that does not have the active clamp circuit 105.

SUMMARY OF THE INVENTION

However, the isolated resonant converter 100 as a conventional power converter described above has the following problem to be solved. That is, although the isolated resonant converter 100 is configured so that the peak voltage value of the resonant voltage that occurs when the switch 103 has been switched off is limited by the active clamp circuit 105, since the active clamp circuit 105 includes the switch 105a, there are the problems of difficulty in producing a design that accurately and stably controls on/off switching of the switch 105a and of a rise in component cost.

The present invention was conceived in view of the problem described above and has an object of providing a power converter capable of limiting, with a simple configuration, the peak voltage value of a resonant voltage that is generated across both ends of a switch that drives a transformer (isolation transformer).

To achieve the stated object, a power converter according to the present invention comprises: two direct current (DC) input terminals that input a DC input voltage; two DC output terminals that output a DC output voltage; an isolation transformer with a primary winding and a secondary winding; a switch that is connected across the two DC input terminals in a state where the switch is connected in series to the primary winding and that switches the DC input voltage; an LC resonance circuit that includes an inductance and a capacitance and is connected in parallel to the primary winding; a first resonant capacitance that is connected in parallel to the switch; a second resonant capacitance that is connected in parallel to the secondary winding; and a rectifying and smoothing circuit that rectifies and smoothes a voltage generated across both ends of the second resonant capacitance and outputs as the DC output voltage across the two DC output terminals.

A power converter according to the present invention comprises: two DC input terminals that input a DC input voltage; two DC output terminals that output a DC output voltage; an isolation transformer with a primary winding and a secondary winding that has a center tap terminal; a switch that is connected across the two DC input terminals in a state where the switch is connected in series to the primary winding and that switches the DC input voltage; an LC resonance circuit that includes an inductance and a capacitance and is connected in parallel to the primary winding; a first resonant capacitance that is connected in parallel to the switch; a third resonant capacitance that is connected between one end of the secondary winding and the center tap terminal; a fourth resonant capacitance that is connected between another end of the secondary winding and the center tap terminal; and a rectifying and smoothing circuit that rectifies and smoothes a voltage generated across both ends of the third resonant capacitance and a voltage generated across both ends of the fourth resonant capacitance and outputs as the DC output voltage across the two DC output terminals.

A power converter according to the present invention comprises: two DC input terminals that input a DC input voltage;
  two DC output terminals that output a DC output voltage;
  an isolation transformer with a primary winding, a secondary winding, and an auxiliary winding; a switch that is connected across the two DC input terminals in a state where the switch is connected in series to the primary winding and that switches the DC input voltage; an LC resonance circuit that includes an inductance and a capacitance and is connected in parallel to the auxiliary winding; a first resonant capacitance that is connected in parallel to the switch; a second resonant capacitance that is connected in parallel to the secondary winding; and a rectifying and smoothing circuit that rectifies and smoothes a voltage generated across both ends of the second resonant capacitance and outputs as the DC output voltage across the two DC output terminals.

In the power converter according to the present invention, the switch performs a Class E switching operation.

In the power converter according to the present invention, the LC resonance circuit is composed of a series circuit including an inductance and a capacitance.

In the power converter according to the present invention, frequency characteristics of an impedance when looking from both ends of the switch when the two DC input terminals are shorted are formed so as to include, in order from a low frequency band to a high frequency band, a first resonant frequency, a second resonant frequency, a third resonant frequency, a fourth resonant frequency, and a fifth resonant frequency, only the first resonant frequency and the second resonant frequency out of the five resonant frequencies are lower than a switching frequency of the switch, only the third resonant frequency is lower than a frequency that is double the switching frequency, the fourth resonant frequency is substantially equal to double the switching frequency, the fifth resonant frequency is higher than double the switching frequency, and the impedance has local maxima at the first resonant frequency, the third resonant frequency, and the fifth resonant frequency and has local minima at the second resonant frequency and the fourth resonant frequency.

In the power converter according to the present invention, the LC resonance circuit has two series circuits that are each composed of an inductance and a capacitance and the two series circuits are connected in parallel.

In the power converter according to the present invention, frequency characteristics of an impedance when looking from both ends of the switch when the two DC input terminals are shorted are formed so as to include, in order from a low frequency band to a high frequency band, a first resonant frequency, a second resonant frequency, a third resonant frequency, a fourth resonant frequency, a fifth resonant frequency, a sixth resonant frequency, and a seventh resonant frequency, only the first resonant frequency and the second resonant frequency out of the seven resonant frequencies are lower than a switching frequency of the switch, only the third resonant frequency is lower than a frequency that is double the switching frequency, the fourth resonant frequency is substantially equal to double the switching frequency, the fifth resonant frequency is higher than double the switching frequency and lower than four times the switching frequency, the sixth resonant frequency is substantially equal to four times the switching frequency, the seventh resonant frequency is higher than four times the switching frequency, and the impedance has local maxima at the first resonant frequency, the third resonant frequency, the fifth resonant frequency, and the seventh resonant frequency and has local minima at the second resonant frequency, the fourth resonant frequency, and the sixth resonant frequency.

With the power converter according to the present invention, since it is possible to use a simple configuration where an LC resonance circuit is connected in parallel to the primary winding of an isolation transformer that has a leakage inductance or a simple configuration where an LC resonance circuit is connected in parallel to an auxiliary winding of an isolation transformer, it is possible to suppress (limit) the peak voltage of a resonant voltage generated across both ends of the switch when the switch is off to around double the amplitude of the DC input voltage. Accordingly, it becomes possible to use a switch with a low withstand voltage as the switch, and since many switches with a low withstand voltage are switches with a low on-resistance, it is possible to use a switch with a low on-resistance as the switch. As a result, it is possible to reduce the conduction loss (or "On loss") for the switch and increase the conversion efficiency. Since it is also possible to lower the derating factor of the voltage of the switch, it is possible to achieve high reliability for the switch. Also, since the power converter according to the present invention is configured so that a load network whose impedance has frequency characteristics that are set in advance, more specifically a load network with frequency characteristics with the five resonant frequencies described above or a load network with frequency characteristics with the seven resonant frequencies described above, is used as the load of the switch, the switch performs a Class E switching operation, which means that it is possible to convert a DC input voltage to a DC output voltage with higher power conversion efficiency under high frequency operation. In particular, with the configuration that has a load network with frequency characteristics including seven resonant frequencies as the load, compared to the operation waveform across both ends of the switch for the configuration that has a load network with frequency characteristics including five resonant frequencies as the load, it is possible to make the operation waveform across both ends of the switch a waveform that has a more sudden rise and fall and where the amplitude of fluctuations in a central part are suppressed, or in other words, a waveform that is closer to a rectangular waveform. This means that it is possible to further suppress the peak voltage compared to the operation waveform described above for the configuration that has a load network with frequency characteristics including five resonant frequencies as the load (that is, a waveform where the peak voltage is suppressed to around double the DC input voltage).

Also, since the power converter according to the present invention is configured so that the isolation transformer has a secondary winding with a center tap terminal, by having the rectifying and smoothing circuit rectify and smooth the voltage generated across both ends of the third and fourth resonant capacitances with the center tap terminal as a reference, it is possible to double the frequency of the current flowing to the output capacitance that constructs the rectifying and smoothing circuit. This means that if the capacitance value of the output capacitance is set equal to the output capacitance in a configuration where there is no center tap terminal on the secondary winding, it is possible to halve the output ripple voltage of the DC output voltage, and if the output ripple voltage is set equal to a configuration where there is no center tap terminal on the secondary winding, it is possible to halve the capacitance value of the output capacitance (which results in miniaturization).

Also, with the power converter according to the present invention, by constructing the isolation transformer with an auxiliary winding and connecting an LC resonance circuit in parallel to the auxiliary winding, it is possible, by appropriately setting the turn ratio between the primary winding and the auxiliary winding, to lower the voltage applied to the inductance and the capacitance that construct the LC resonance circuit compared to a configuration where an LC resonance circuit is connected in parallel to the primary winding. This means that it is possible to use low-cost components with lower withstand voltages as the inductance and the capacitance.

It should be noted that the disclosure of the present invention relates to a content of Japanese Patent Application No. 2017-247535 that was filed on 25 Dec. 2017 and the entire content of which is herein incorporated by reference.

BRIEF DESCRIPTION OF THE DRAWINGS

These and other objects and features of the present invention will be explained in more detail below with reference to the attached drawings, wherein:

FIG. 3 is a waveform diagram useful in explaining the operation of the converter 1a;

DESCRIPTION OF THE PREFERRED EMBODIMENTS

Several preferred embodiments of the present invention will now be described. Note that the present invention is not limited to the embodiments given below. The component elements described below include equivalent component elements and component elements that should be apparent to those skilled in the art, and such component elements may be combined as appropriate.

Preferred embodiments of the present invention will now be described in detail with reference to the drawings. Note that in the description of the drawings, elements that are the same have been assigned the same reference numerals and duplicated description thereof is omitted.

First, the overall configuration of a power converter according to a first preferred embodiment of the present invention will be described with reference to FIG. 1, with a converter 1a as one example of a power converter. The converter 1a includes a pair of DC input terminals 2a and 2b (hereinafter collectively referred to as the "DC input terminals 2" when no distinction is made between them), a pair of DC output terminals 3a and 3b (hereinafter collectively referred to as the "DC output terminals 3" when no distinction is made between them), an isolation transformer 4, a switch 5, an LC resonance circuit 6, a first resonant capacitance 7, a second resonant capacitance 8, and a rectifying and smoothing circuit 9. The converter 1a is configured as an isolated converter where the DC input terminals 2 side and the DC output terminals 3 side are electrically isolated.

More specifically, the DC input voltage (or simply "DC voltage") V1 is inputted across the pair of DC input terminals 2a and 2b with the DC input terminal 2b connected to a reference potential (in the present embodiment, a common ground G) as the low potential side. The DC output voltage V2 is outputted across the pair of DC output terminals 3a and 3b where the potential of the DC output terminal 3a is positive with the DC output terminal 3b as a reference. A load LD is connected across the DC output terminals 3a and 3b of the converter 1a so that the DC output voltage V2 is supplied to the load LD.

The isolation transformer 4 is constructed by forming a primary winding 4a and a secondary winding 4b so as to be isolated from each other on a magnetic core. In FIG. 1, the isolation transformer 4 is depicted by an equivalent circuit and includes an ideal transformer 4c, which amplifies the voltage applied to the primary winding 4a by the turn ratio of the primary winding 4a and the secondary winding 4b and outputs the amplified voltage to the secondary winding 4b, a leakage inductance 4d of the primary winding 4a, a leakage inductance 4e of the secondary winding 4b, and an excitation inductance 4f. Note that it is assumed here that other elements, such as the primary winding resistance and the secondary winding resistance, are negligible.

As examples, the switch 5 is constructed of a MOSFET or a bipolar transistor. As one example in the present embodiment, the switch 5 is constructed of a MOSFET. The switch 5 is connected across the DC input terminals 2a and 2b in a state where the switch 5 is connected in series to the primary winding 4a of the isolation transformer 4. More specifically, the primary winding 4a is connected to the DC input terminal 2a and the switch 5 is connected to the DC input terminal 2b. With this configuration, the switch 5 switches the DC input voltage V1 inputted from the DC input terminals 2 by performing on/off operations.

The LC resonance circuit 6 is configured as a two-terminal circuit network which includes an inductance and a capacitance and has two external connection terminals (a first connector 61 and a second connector 62). As one example in the present embodiment, the LC resonance circuit 6 includes one series circuit (a series resonance circuit) composed of an inductance 6a and a capacitance 6b, with the series circuit being connected between the first connector 61 and the second connector 62 and connected in parallel to the primary winding 4a of the isolation transformer 4. The first resonant capacitance 7 is connected in parallel to the switch 5. When the switch 5 is a semiconductor element such as a MOSFET, the first resonant capacitance 7 may include the capacitance (parasitic capacitance) of junctions provided in the switch 5 or may be composed of only the capacitance of such junctions. The second resonant capacitance 8 is connected in parallel to the secondary winding 4b of the isolation transformer 4.

The rectifying and smoothing circuit 9 is disposed between the second resonant capacitance 8 and the DC output terminals 3a and 3b and, by rectifying and smoothing the voltage generated across the second resonant capacitance 8, generates the DC output voltage V2 which is outputted to the DC output terminals 3a and 3b. As one example in the present embodiment, the rectifying and smoothing circuit 9 includes, between one end of the second resonant capacitance 8 (the upper end in FIG. 1) and the DC output terminal 3a, a rectifier 9a which is disposed so that a current output terminal is connected to the DC output terminal 3a (as one example in the present embodiment, a diode, with the cathode terminal of the diode as the current output terminal being connected to the DC output terminal 3a), and an output capacitance 9b connected across the DC output terminals 3a and 3b.

Note that although not illustrated, the rectifier 9a can also be disposed between the other end (the lower end in FIG. 1) of the second resonant capacitance 8 and the DC output terminal 3b. In this case, the current output terminal of the rectifier 9a (the cathode terminal, when the rectifier 9a is a diode as in the present embodiment) is connected to the other end of the second resonant capacitance 8. In addition, the rectifier 9a is not limited to being constructed of a single diode, and although not illustrated, it is also possible for example to construct the rectifier 9a of a synchronous rectification circuit which is constructed of a parallel circuit with a diode and a switch where the switch switches to the on state in synchronization with the timing at which a current flows through the diode.

In the converter 1a, the isolation transformer 4, the LC resonance circuit 6, and the first resonant capacitance 7 connected to the switch 5 function as a load network for the switch 5. Here, since the primary winding 4a and the secondary winding 4b of the isolation transformer 4 are magnetically coupled, the second resonant capacitance 8 and the rectifying and smoothing circuit 9 connected on the secondary winding 4b side are also included in the load network.

Figure 1:
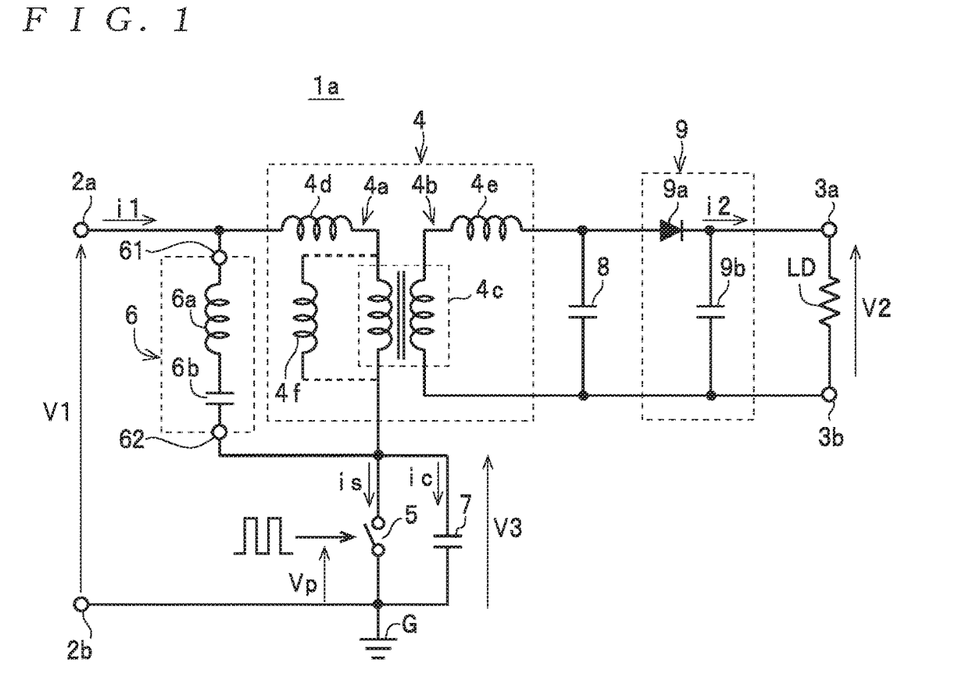
FIG. 1 is a diagram depicting the circuit configuration of a converter 1a as a power converter according to a first embodiment of the present invention.
Figure 2:
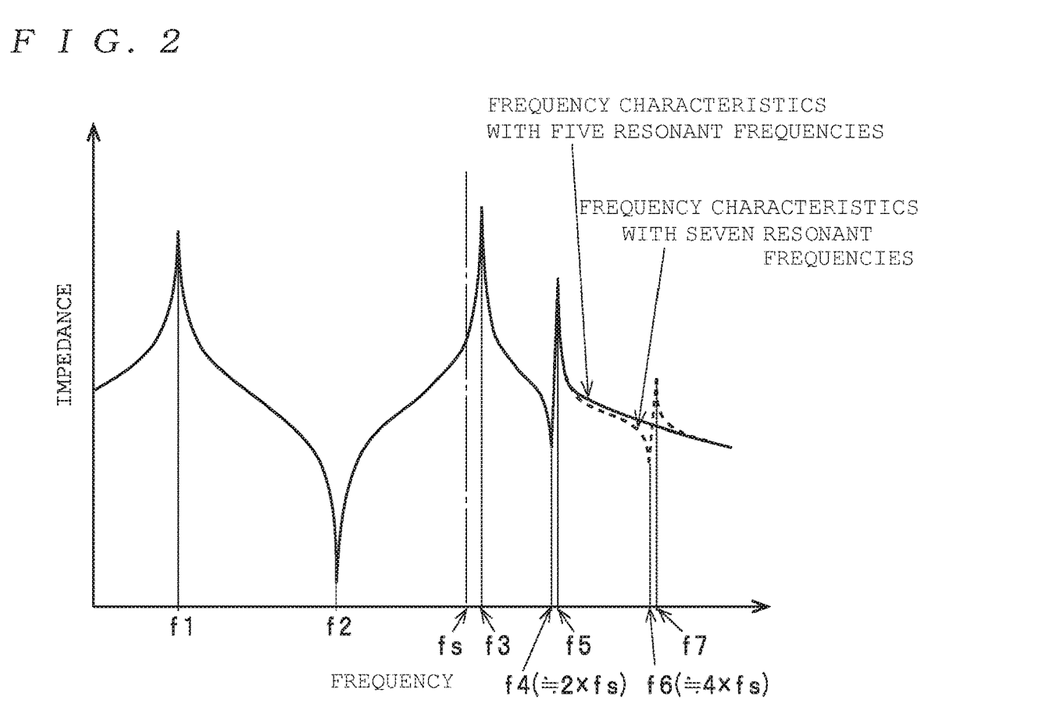
FIG. 2 is a diagram useful in explaining the frequency characteristics of an impedance of a load network connected across both ends of a switch 5.

This load network causes resonant switching of the switch 5 (more specifically, a Class E switching operation), and is configured so that the frequency characteristics of the impedance when looking from both ends of the switch 5 when the two DC input terminals 2a and 2b are shorted (that is, when the impedance is low) are the frequency characteristics depicted in FIG. 2. Note that since the DC input voltage (a DC voltage) V1 is inputted across the DC input terminals 2a and 2b from an external power supply that typically has a low output impedance, when the converter 1a is in a normal operating state, the DC input terminals 2a and 2b are always shorted (that is, set in a low impedance state).

More specifically, as depicted in FIG. 2, the frequency characteristics of the impedance of the load network include, in order from a low frequency band to a high frequency band, a first resonant frequency f1, a second resonant frequency f2, a third resonant frequency f3, a fourth resonant frequency f4, and a fifth resonant frequency f5. Out of the five resonant frequencies f1, f2, f3, f4, and f5, only the first resonant frequency f1 and the second resonant frequency f2 are lower than the switching frequency fs of the switch 5, and out of the three resonant frequencies f3, f4, and f5 that are higher than the switching frequency fs, only the third resonant frequency f3 is lower than double the frequency (2×fs) of the switching frequency fs, the fourth resonant frequency f4 is substantially equal to double the frequency (2×fs) of the switching frequency fs, and the fifth resonant frequency f5 is higher than double the frequency (2×fs) of the switching frequency fs. Also in the frequency characteristics of the impedance, the impedance has local maxima at the first resonant frequency f1, the third resonant frequency f3, and the fifth resonant frequency f5 and has local minima at the second resonant frequency f2 and the fourth resonant frequency f4 (≈2×fs).

Figure 8:
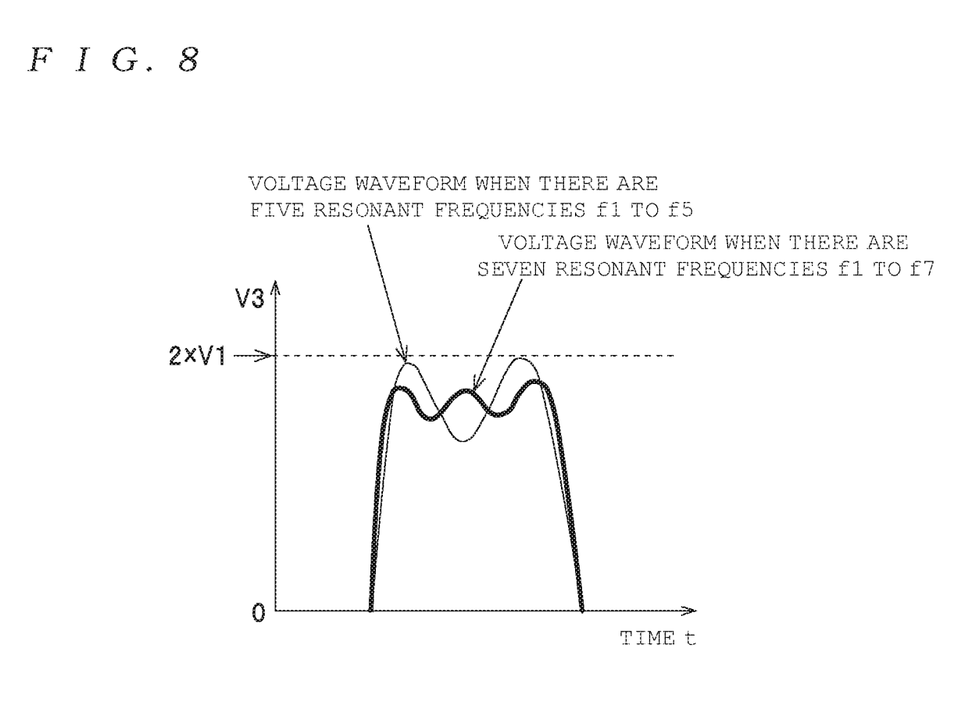
FIG. 8 is a schematic diagram useful in explaining the voltage waveform of a voltage V3 in FIGS. 3 and 5.

Although a voltage V3 (see FIG. 1) is generated with the same frequency as the switching frequency fs across both ends of the switch 5 that switches with a load network whose impedance has the frequency characteristics described above as a load, since the load network is configured to have impedance characteristics where the impedance is substantially a local minimum at even-numbered multiples (in the example described above, double) of the switching frequency fs as described above, out of the harmonic components that construct the waveform of the voltage V3 generated across both ends, the even-numbered components are attenuated and the fundamental harmonic component (the first harmonic wave component) and the odd-numbered components (mainly the third harmonic wave component) remain. As a result, with a configuration that has five resonant frequencies f1 to f5 as in the present embodiment, as depicted in FIG. 8, it is possible to suppress the voltage V3 generated across both ends of the switch 5 to around double the DC input voltage V1.

Figure 3:
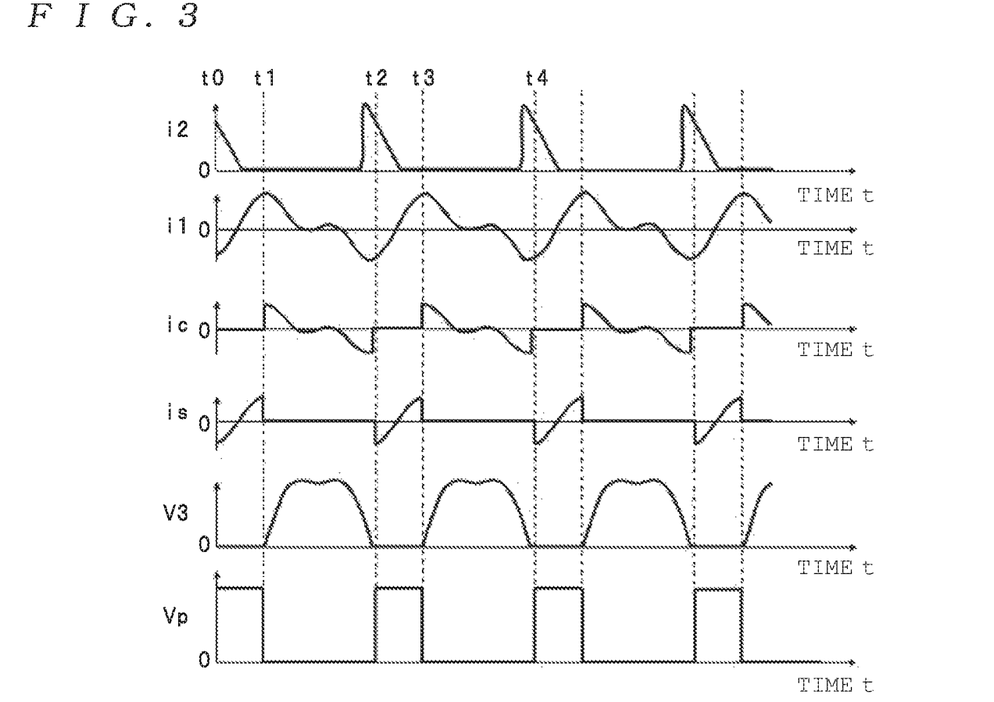

Next, the fundamental operation of the converter 1a depicted in FIG. 1 will be described together with the operation waveforms in each period, with reference to FIG. 1 and the waveform diagram in FIG. 3 (a waveform diagram for steady state operation).

Out of the operations in each period, the operation in the period from time t0 to time t1 will be described first. At time t (=t0), the driving signal voltage Vp outputted from a control circuit (not depicted) that controls on/off switching of the switch 5 becomes the high level to switch on the switch 5 and this high level is maintained until time t (=t1). Accordingly, in the period from time t0 to time t1, the switch 5 becomes on, the voltage V3 applied across both ends (generated across both ends) of the switch 5 is zero, and the current ic that flows in the first resonant capacitance 7 is zero.

Due to the characteristics of the load network described above, the current is that flows in the switch 5 flows via the switch 5 in a direction from the DC input terminal 2b toward the DC input terminal 2a (that is, in the negative direction), gradually falls thereafter to reach zero, and then starts to flow in a direction from the DC input terminal 2a toward the DC input terminal 2b (that is, in the positive direction) and gradually rises. The input current i1 also changes in the same way as the current is from the periphery of a resonant peak in the negative direction, and gradually rises toward a resonant peak in the positive direction. On the other hand, the output current i2 during this period gradually falls from a positive value to become zero before time t (=t1) and thereafter stays at zero.

Next, the operation in the period from time t1 to time t2 will be described. The driving signal voltage Vp supplied to the switch 5 has a low level to set the switch 5 at off at time t (=t1), and maintains this low level until time t (=t2). This means that the switch 5 remains in the off state during this period. In this period, immediately after the switch 5 becomes off, the voltage V3 applied across both ends of the switch 5 gradually rises due to resonance from zero to an amplified voltage that is around double the DC input voltage V1 and, after maintaining this voltage for a certain time, the voltage V3 falls and returns to zero at time t (=t2). Also, at time t (=t2), the derivative with respect to time of the voltage V3 (that is, the rate of change of the voltage with respect to time) also becomes zero. That is, the switch 5 performs a Class E switching operation.

By switching the switch 5 off during the period from time t1 to time t2, the current is that was previously flowing to the switch 5 becomes zero, and in place of this, the current ic flows in the first resonant capacitance 7. The current ic is a resonant current that has a resonant peak in the positive direction and a resonant peak in the negative direction (that is, two resonant peaks). Corresponding to this, the input current i1 also becomes a resonant current with a resonant peak in the positive direction and a resonant peak in the negative direction (that is, two resonant peaks). The output current i2 is kept at zero for a certain time from the start of this period, but rises with a high slew-rate (that is, sharply) from just before the time t (=t2) is reached. After reaching a peak value, the output current i2 that has risen gradually falls until the current value at time t0 is reached at time t (=t2).

After this, the operation in the period from time t2 to time t3 is the same as the operation in the period from time t0 to time t1 described above and the operation in the period from time t3 to time t4 after this is also the same as the operation in the period from time t1 to time t2 described above. By doing so, the operation in the period from time t0 to time t2 is repeated in the following periods.

In this way, according to the converter 1a, since a load network whose impedance has the frequency characteristics depicted in FIG. 2 (that is, frequency characteristics with the five resonant frequencies f1 to f5) is used as the load, the switch 5 performs a Class E switching operation (that is, the voltage V3 can be zero and the slope of the voltage V3 can be zero at the on/off switching timing of the switch 5), and due to this, it is possible to convert the DC input voltage V1 to the DC output voltage V2 with high power conversion efficiency under high frequency operation. The converter 1a is also realized by a simple configuration where the LC resonance circuit 6 is connected in parallel to the primary winding 4a of the isolation transformer 4 that has the leakage inductance 4d, and is capable of suppressing (limiting) the peak voltage of the voltage V3 applied across both ends of the switch 5 (that is, the resonant voltage generated across both ends) to around double the amplitude of the DC input voltage V1. Accordingly, with the converter 1a, it becomes possible to use a switch with a low withstand voltage as the switch 5, and since many switches with a low withstand voltage have a low on-resistance, this means that it is possible to use a switch with a low on-resistance as the switch 5. As a result, it is possible to reduce the conduction loss (or "On loss") for the switch 5 and further increase the conversion efficiency of the converter 1a.

Figure 4:
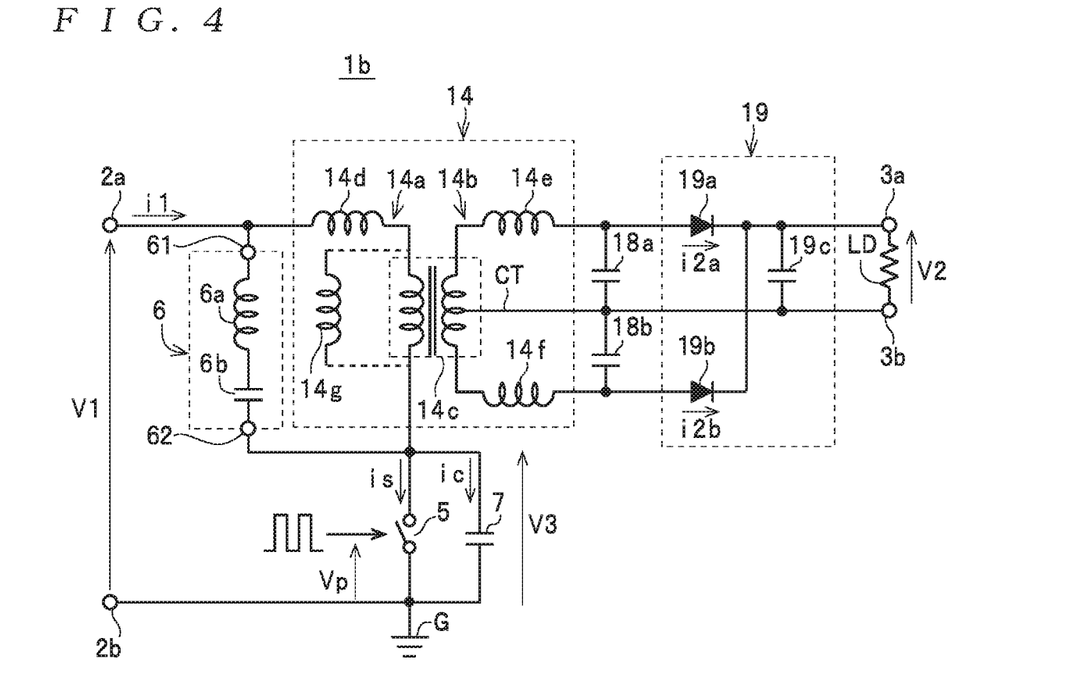
FIG. 4 is a diagram depicting the circuit configuration of a converter 1b as a power converter according to a second embodiment of the present invention.

Next, the overall configuration of a power converter according to a second preferred embodiment of the present invention will be described with reference to FIG. 4, with a converter 1b as one example of a power converter. Note that elements that are the same as in the converter 1a have been assigned the same reference numerals and duplicated description thereof is omitted.

The converter 1b includes the pair of DC input terminals 2, the pair of DC output terminals 3, an isolation transformer 14, the switch 5, the LC resonance circuit 6, the first resonant capacitance 7, third and fourth resonant capacitances 18a and 18b, and a rectifying and smoothing circuit 19. The converter 1b is configured as an isolated converter where the DC input terminals 2 side and the DC output terminals 3 side are electrically isolated from each other.

The isolation transformer 14 is constructed by forming a primary winding 14a and a secondary winding 14b that has a center tap terminal CT so as to be isolated from each other on a magnetic core. In FIG. 4, the isolation transformer 14 is depicted by an equivalent circuit and includes an ideal transformer 14c that amplifies the voltage applied to the primary winding 14a by the turn ratio of the primary winding 14a and the secondary winding 14b and outputs to the secondary winding 14b, a leakage inductance 14d of the primary winding 14a, leakage inductances 14e and 14f of the second winding 14b, and an excitation inductance 14g. Note that it is assumed here that other elements, such as the primary winding resistance and the secondary winding resistance, are negligible.

The third resonant capacitance 18a is connected in parallel to a winding at one end (the upper end in FIG. 4) of the secondary winding 4b of the isolation transformer 4 which is defined by the center tap terminal CT of the secondary winding 4b. Similarly, the fourth resonant capacitance 18b is connected in parallel to a winding at the other end (the lower end in FIG. 4) of the secondary winding 4b of the isolation transformer 4 which is defined by the center tap terminal CT of the secondary winding 4b. The center tap terminal CT of the isolation transformer 4 is also connected to the DC output terminal 3b.

The rectifying and smoothing circuit 19 is disposed between the third and fourth resonant capacitances 18a and 18b and the DC output terminals 3a and 3b and by rectifying and smoothing the voltages respectively generated across both ends of the third and fourth resonant capacitances 18a and 18b, generates the DC output voltage V2 and outputs to the DC output terminals 3a and 3b.

As one example in the present embodiment, the rectifying and smoothing circuit 19 includes a rectifier 19a which is disposed between one end of the third resonant capacitance 18a (the upper end in FIG. 4) and the DC output terminal 3a so that the current output terminal is connected to the DC output terminal 3a (as one example in the present embodiment, a diode, with the cathode terminal as a current output terminal of the diode being connected to the DC output terminal 3a), a rectifier 19b which is disposed between one end of the fourth resonant capacitance 18b (the lower end in FIG. 4) and the DC output terminal 3a so that the current output terminal is connected to the DC output terminal 3a (as one example in the present embodiment, a diode, with the cathode terminal as a current output terminal of the diode being connected to the DC output terminal 3a), and an output capacitance 19c connected between the DC output terminals 3a and 3b.

Note that the present invention is not limited to the configuration described above where the current output terminals of the rectifiers 19a and 19b (in the present embodiment, the cathode terminals of the diodes 19a and 19b) are connected to the DC output terminal 3a and the center tap terminal CT of the isolation transformer 4 is connected to the DC output terminal 3b. As one example, although not illustrated, it is also possible to use a configuration where the rectifiers 19a and 19b are connected to the ends of the secondary winding 14b with reversed polarities to the polarities depicted in FIG. 4 (that is, the current output terminals of the rectifiers 19a and 19b (cathode terminals in the case of diodes) are connected to the ends of the secondary winding 14b), the current input terminals of the rectifiers 19a and 19b (anode terminals in the case of diodes) are connected to the DC output terminal 3b, and the center tap terminal CT of the isolation transformer 4 is connected to the DC output terminal 3a. The rectifiers 19a and 19b are also not limited to being constructed of single diodes, and may be constructed of synchronous rectification circuits in the same way as the rectifier 9a described earlier.

In the converter 1b, the isolation transformer 14, the LC resonance circuit 6, and the first resonant capacitance 7 connected to the switch 5 function as a load network for the switch 5. Here, since the primary winding 14a and the secondary winding 14b of the isolation transformer 14 are magnetically coupled, the third and fourth resonant capacitances 18a and 18b and the rectifying and smoothing circuit 19 connected on the secondary winding 14b side are also included in the load network.

This load network causes resonant switching of the switch 5 (more specifically, a Class E switching operation), and is configured so that the frequency characteristics of the impedance when looking from both ends of the switch 5 when the two DC input terminals 2a and 2b are shorted (that is, when the impedance is low) are the frequency characteristics depicted in FIG. 2 (that is, frequency characteristics with the five resonant frequencies f1 to f5).

This means that with the converter 1b also, in the same way as the converter 1a described above, it is possible to suppress the voltage V3, which is generated across both ends of the switch 5 that performs switching with a load network whose impedance has the frequency characteristics described above as the load, to around double the DC input voltage V1.

Figure 5:
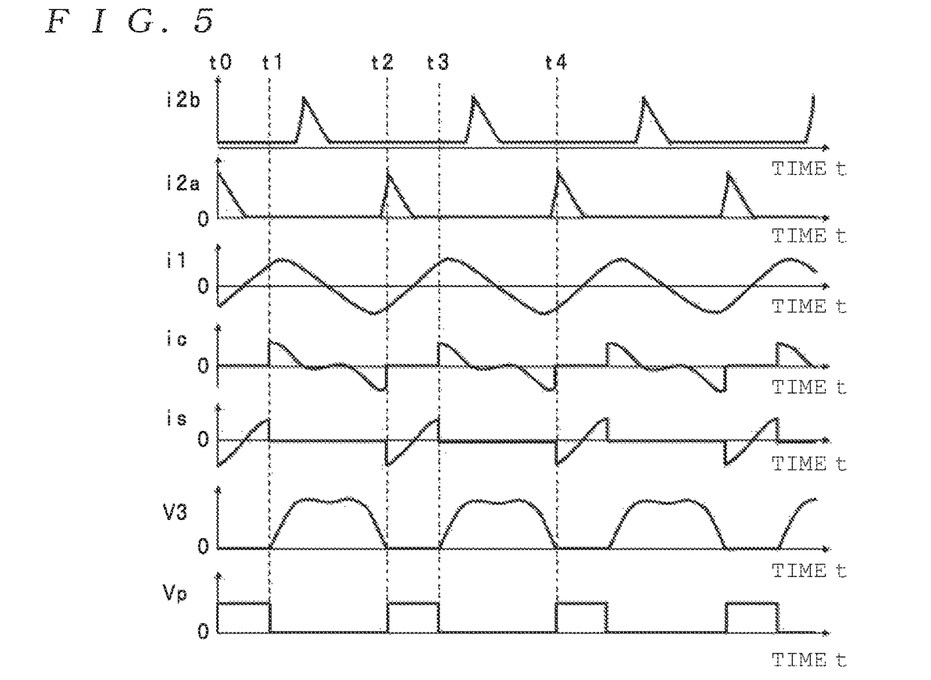
FIG. 5 is a waveform diagram useful in explaining the operation of the converter 1b.

Next, the fundamental operation of the converter $1b$ depicted in FIG. 4 will be described together with the operation waveforms in each period, with reference to FIG. 4 and the waveform diagram in FIG. 5 (a waveform diagram for steady state operation).

Out of the operations in each period, the operation in the period from time t0 to time t1 will be described first. At time t (=t0), the driving signal voltage Vp outputted from a control circuit (not depicted) that controls on/off switching of the switch 5 becomes the high level to switch on the switch 5, and this high level is maintained until time t (=t1). Accordingly, in the period from time t0 to time t1, the switch 5 becomes on, the voltage V3 applied across both ends (generated across both ends) of the switch 5 is zero, and the current ic that flows in the first resonant capacitance 7 is zero.

Due to the characteristics of the load network described above, the current is that flows in the switch 5 flows via the switch 5 in a direction from the DC input terminal $2b$ toward the DC input terminal $2a$ (that is, in the negative direction), gradually falls thereafter to reach zero, and then starts to flow in a direction from the DC input terminal $2a$ toward the DC input terminal $2b$ (that is, in the positive direction) and gradually rises. The input current i1 also changes in the same way as the current is from the periphery of a resonant peak in the negative direction, and gradually rises toward a resonant peak in the positive direction.

An output current $i2a$ during this period gradually falls from a positive value to become zero before time t (=t1) and is thereafter kept at zero. On the other hand, an output current $i2b$ during this period is kept at zero.

Next, the operation in the period from time t1 to time t2 will be described. The driving signal voltage Vp supplied to the switch 5 has a low level to set the switch 5 at off at time t (=t1) and maintains this low level until time t (=t2). This means that the switch 5 remains in the off state during this period. In this period, immediately after the switch 5 becomes off, the voltage V3 applied across both ends of the switch 5 gradually rises due to resonance from zero to an amplified voltage that is around double the DC input voltage V1 and, after maintaining this voltage for a certain time, the voltage V3 falls and returns to zero at time t (=t2). Also, at time t (=t2), the derivative with respect to time of the voltage V3 (that is, the rate of change of voltage with respect to time) also becomes zero. That is, the switch 5 performs a Class E switching operation.

By turning the switch 5 off during the period from time t1 to time t2, the current is that was previously flowing to the switch 5 becomes zero, and in place of this, the current ic flows to the first resonant capacitance 7. The current ic is a resonant current that has a resonant peak in the positive direction and a resonant peak in the negative direction (that is, two resonant peaks). Corresponding to this, the input current i1 also becomes a resonant current with a resonant peak in the positive direction and a resonant peak in the negative direction (that is, two resonant peaks).

In a state where the input current i1 is flowing in the positive direction, the output current $i2b$ rises from zero with a high slew-rate (that is, sharply), falls after reaching a peak value, becomes zero at substantially the same timing at which the input current i1 becomes zero, and is then kept at zero until time t2. On the other hand, the output current $i2a$ is kept at zero from the start of this period, rises with a high slew-rate (that is, sharply) immediately before the end of the period (that is, just before time t2 is reached), and reaches the same current value as time t0 at time t (=t2).

After this, the operation in the period from time t2 to time t3 is the same as the operation in the period from time t0 to time t1 described above and the operation in the period from time t3 to time t4 after this is also the same as the operation in the period from time t1 to time t2 described above. By doing so, the operation in the period from time t0 to time t2 is repeated in the following periods.

In this way, according to the converter $1b$, since a load network whose impedance has the frequency characteristics depicted in FIG. 2 is used as the load, the switch 5 performs a Class E switching operation (that is, the voltage V3 can be zero and the slope of the voltage V3 can be zero at the on/off switching timing of the switch 5), and due to this, it is possible to convert the DC input voltage V1 to the DC output voltage V2 with high power conversion efficiency under high frequency operation. The converter $1b$ is also realized by a simple configuration where the LC resonance circuit 6 is connected in parallel to the primary winding $4a$ of the isolation transformer 4 that has the leakage inductance $4d$, and is capable of suppressing (limiting) the peak voltage of the voltage V3 applied across both ends of the switch 5 (that is, the resonant voltage generated across both ends) to around double the amplitude of the DC input voltage V1. Accordingly, with the converter $1b$, it becomes possible to use a switch with a low withstand voltage as the switch 5, and since many switches with a low withstand voltage have a low on-resistance, this means that it is possible to use a switch with a low on-resistance as the switch 5. As a result, it is possible to reduce the conduction loss (or "On loss") for the switch 5 and further increase the conversion efficiency of the converter $1b$. Also, since the frequency of the current flowing to the output capacitance $19c$ is double, if the capacitance value of the output capacitance $19c$ is the same as the output capacitance $9b$ of the converter $1a$, it is possible to halve the output ripple voltage compared to the converter $1a$, or if the output ripple voltage is the same as the converter $1a$, it is possible to halve the capacitance value of the output capacitance $19c$ (which results in miniaturization).

Note that although the operation of the respective embodiments have been described under conditions where the on time of the driving signal voltage Vp that performs on/off control of the switch 5 is shorter than the off time, when the on time and off time of the switch 5 differ to the example described above, there are also cases where the operation voltages and timing of operation current peaks of the respective elements differ.

Also, although the converters $1a$ and $1b$ that use configurations where the LC resonance circuit 6 is connected in parallel to the primary winding $4a$ of the isolation transformer 4 have been described, the connected location of the LC resonance circuit 6 is not limited to this. As one example, like a converter $1c$ depicted in FIG. 6, it is also possible to use a configuration where the LC resonance circuit 6 is connected in parallel to an auxiliary winding $24c$ that is formed together with a primary winding $24a$ and a secondary winding $24b$ in an isolation transformer 24. The converter $1c$ as one example of a power converter according to a third preferred embodiment of the present invention will now be described with reference to FIG. 6. Note that elements that are the same as in the converter $1a$ have been assigned the same reference numerals and duplicated description thereof is omitted. Since the operations are also the same as the converter $1a$, description thereof is omitted.

Figure 6:
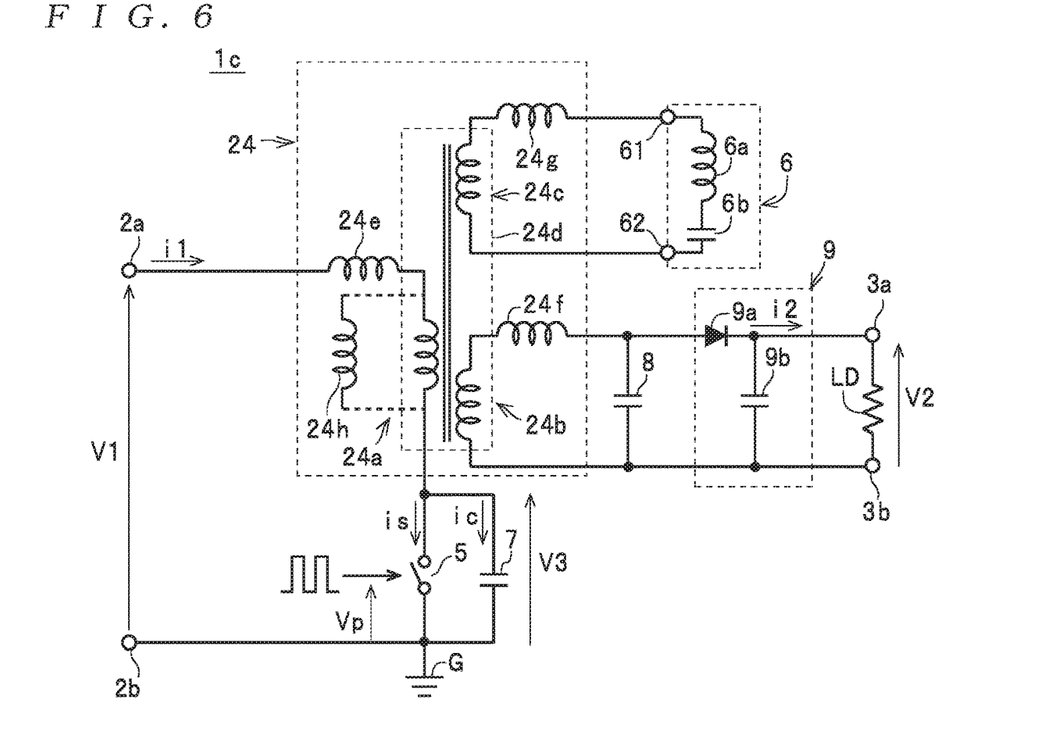
FIG. 6 is a diagram depicting the circuit configuration of a converter 1c as a power converter according to a third embodiment of the present invention.

The converter 1c includes the pair of DC input terminals 2, the pair of DC output terminals 3, the isolation transformer 24, the switch 5, the LC resonance circuit 6, the first resonant capacitance 7, the second resonant capacitance 8, and the rectifying and smoothing circuit 9. The converter 1c is configured as an isolated converter where the DC input terminals 2 side and the DC output terminals 3 side are electrically isolated from each other.

The isolation transformer 24 is constructed by forming the primary winding 24a, the secondary winding 24b, and the auxiliary winding 24c so as to be isolated from each other on a magnetic core. In FIG. 6, the isolation transformer 24 is depicted by an equivalent circuit and includes an ideal transformer 24d, which amplifies the voltage applied to the primary winding 24a by the turn ratio of the primary winding 24a and the secondary winding 24b and outputs to the secondary winding 24b and also amplifies by the turn ratio of the primary winding 24a and the auxiliary winding 24c and outputs to the auxiliary winding 24c, a leakage inductance 24e of the primary winding 24a, a leakage inductance 24f of the secondary winding 24b, a leakage inductance 24g of the auxiliary winding 24c, and an excitation inductance 24h. Note that it is assumed here that other elements, such as the primary winding resistance, the secondary winding resistance, and the auxiliary winding resistance are negligible.

The LC resonance circuit 6 is connected in parallel to the auxiliary winding 24c of the isolation transformer 24.

In the converter 1c, the isolation transformer 24 and the first resonant capacitance 7 connected to the switch 5 function as a load network for the switch 5. Here, since the primary winding 24a, the secondary winding 24b, and the auxiliary winding 24c of the isolation transformer 24 are magnetically coupled to each other, the second resonant capacitance 8 and the rectifying and smoothing circuit 9 connected on the secondary winding 24b side are also included in the load network and the LC resonance circuit 6 connected to the auxiliary winding 24c is also included in the load network.

This load network causes resonant switching of the switch 5 (more specifically, a Class E switching operation), and is configured so that the frequency characteristics of the impedance when looking from both ends of the switch 5 when the two DC input terminals 2a and 2b are shorted (that is, when the impedance is low) are the frequency characteristics depicted in FIG. 2.

This means that with the converter 1c also, in the same way as the converter 1a described above, it is possible to suppress the voltage V3, which is generated across both ends of the switch 5 that performs switching with a load network whose impedance has the frequency characteristics described above as the load, to around double the DC input voltage V1. In the converter 1c also, in the same way as the converter 1a, the switch 5 performs a Class E switching operation.

Accordingly, the converter 1c has the same effects as the converter 1a, that is, a simple configuration and the ability to suppress (limit) the peak voltage of the voltage V3 applied across both ends of the switch 5 (that is, the resonant voltage generated across both ends) to around double the amplitude of the DC input voltage V1. It is also possible to use a switch with a low withstand voltage as the switch 5. This means that it is possible to use a switch with a low on-resistance as the switch 5, and as a result, it is possible to reduce the conduction loss (or "On loss") of the switch 5 and further increase the conversion efficiency of the converter 1c. With the converter 1c, although the configuration of the isolation transformer 24 is more complex compared to the isolation transformer 4 of the converter 1a due to the provision of the auxiliary winding 24c, by setting the turn ratio of the primary winding 24a and the auxiliary winding 24c at 1:n (where 0<n<1), compared to the configuration of the converter 1a where the LC resonance circuit 6 is connected in parallel to the primary winding 4a, it is possible to reduce the voltage applied to the inductance 6a and the capacitance 6b that construct the LC resonance circuit 6. This means that according to the converter 1c, it is possible to use low-cost components with lower withstand voltages as the inductance 6a and the capacitance 6b. Here, by increasing the coupling ratio between the primary winding 24a and the auxiliary winding 24c, the voltage applied to the inductance 6a and the capacitance 6b can also be further lowered.

Also, although the converters 1a, 1b, and 1c that include the LC resonance circuit 6, which includes a single series circuit (that is, a series resonance circuit), which is composed of the inductance 6a and the capacitance 6b and is connected between the first connector 61 and the second connector 62, have been described above, the LC resonance circuit 6 included in the converters 1a, 1b, and 1c is not limited to this configuration. As one example, as depicted in FIG. 7, it is also possible to use a configuration where the converters 1a, 1b, and 1c are equipped with an LC resonance circuit 6 that includes a series circuit (that is, a series resonance circuit) composed of an inductance 6c and a capacitance 6d in addition to the series circuit composed of the inductance 6a and the capacitance 6b, with the two series circuits being connected in parallel between the first connector 61 and the second connector 62.

In the converters 1a, 1b, and 1c equipped with a load network including the LC resonance circuit 6 of this configuration, as depicted in FIG. 2, the frequency characteristics of the impedance when looking from both ends of the switch 5 when the two DC input terminals 2a and 2b are shorted (that is, when the impedance is low) have two more resonant frequencies (a sixth resonant frequency f6 and a seventh resonant frequency f7 (>f6)) in a frequency band that exceeds the fifth resonant frequency f5 in the frequency characteristics including the five resonant frequencies f1 to f5 described above. Here, the fifth resonant frequency f5 is a frequency that is higher than double the switching frequency fs (=2×fs) but is lower than four times the switching frequency fs (=4×fs), the sixth resonant frequency f6 is substantially equal to four times the switching frequency fs (=4×fs), and the seventh resonant frequency f7 is higher than four times the switching frequency fs (=4×fs). The frequency characteristics of the impedance are formed so that the impedance has local maxima at the first resonant frequency f1, the third resonant frequency f3, the fifth resonant frequency f5, and the seventh resonant frequency f7, and local minima at the second resonant frequency f2, the fourth resonant frequency f4 (≈2×fs) and the sixth resonant frequency f6 (≈4×fs).

Figure 7:
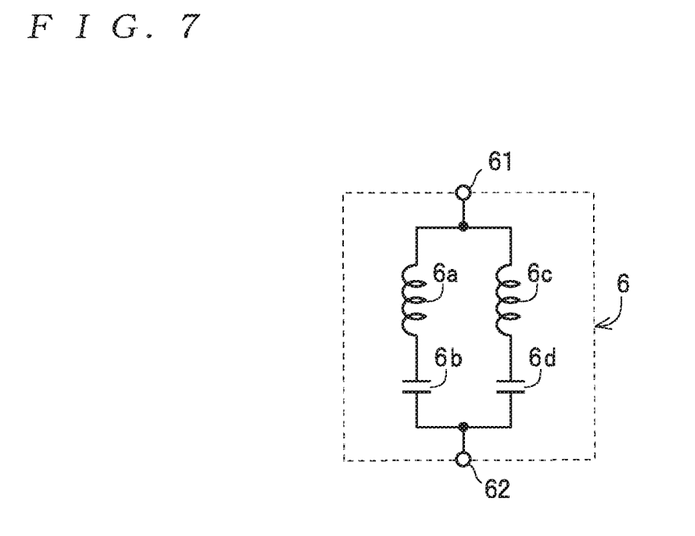
FIG. 7 is a diagram depicting another configuration of an LC resonance circuit 6 that can be used in the converters 1a, 1b, and 1c depicted in FIGS. 1, 4, and 6.

In the same way as the LC resonance circuit 6 including a single series circuit depicted in FIG. 1 and the like, the configuration depicted in FIG. 7, that is, the LC resonance circuit 6 configured with two series circuits that are each composed of an inductance and a capacitance and are connected in parallel, causes the switch 5 to perform resonant switching (that is, a Class E switching operation).

With the converters 1a, 1b, and 1c equipped with this LC resonance circuit 6, the on time and off time of the switch 5 differ to the example described above, and in keeping with this, the operation voltages and timing of operation current peaks of the respective components differ. More specifically, although a voltage V3 (see FIG. 1) with the same frequency as the switching frequency fs is generated across both ends of the switch 5 that performs switching with a load network including the LC resonance circuit 6 of this configuration as the load, since the load network is configured so as to have impedance characteristics where the impedance is substantially a local minimum at even-numbered multiples of the switching frequency fs as described above (in the example described above, two times and four times the switching frequency fs), the even-numbered components out of the harmonic components that construct the waveform of the voltage V3 generated across both ends are attenuated and the fundamental harmonic component (the first harmonic wave component) and the odd-numbered components (mainly the third harmonic wave component and the fifth harmonic wave component) remain. As a result, with a configuration with the seven resonant frequencies f1 to f7 as in the present embodiment, as depicted in FIG. 8, it is possible to suppress the peak voltage of the voltage V3 as the resonant voltage generated across both ends of the switch 5 to lower than around double the DC input voltage V1 (that is, to suppress the peak voltage to a lower voltage than the configuration including the LC resonance circuit 6 with the five resonant frequencies f1 to f5).

Also, although the effects of the present invention are realized using the leakage inductance of an isolation transformer, when the desired leakage inductance is not obtained due to the configuration and/or construction of the isolation transformer, it is also possible to dispose a separate inductance in addition to the leakage inductance of either the primary winding or the secondary winding of the isolation transformer.

Moreover, the invention encompasses any possible combination of some or all of the various embodiments and the modification examples described herein and incorporated herein.

It is possible to achieve at least the following configurations from the above-described example embodiments and the modification examples of the disclosure.

(1) A power converter comprising:
two direct current (DC) input terminals that input a DC input voltage;
two DC output terminals that output a DC output voltage;
an isolation transformer with a primary winding and a secondary winding;
a switch that is connected across the two DC input terminals in a state where the switch is connected in series to the primary winding and that switches the DC input voltage;
an LC resonance circuit that includes an inductance and a capacitance and is connected in parallel to the primary winding;
a first resonant capacitance that is connected in parallel to the switch;
a second resonant capacitance that is connected in parallel to the secondary winding; and
a rectifying and smoothing circuit that rectifies and smoothes a voltage generated across both ends of the second resonant capacitance and outputs as the DC output voltage across the two DC output terminals.

(2) A power converter comprising:
two DC input terminals that input a DC input voltage;
two DC output terminals that output a DC output voltage;
an isolation transformer with a primary winding and a secondary winding that has a center tap terminal;
a switch that is connected across the two DC input terminals in a state where the switch is connected in series to the primary winding and that switches the DC input voltage;
an LC resonance circuit that includes an inductance and a capacitance and is connected in parallel to the primary winding;
a first resonant capacitance that is connected in parallel to the switch;
a third resonant capacitance that is connected between one end of the secondary winding and the center tap terminal;
a fourth resonant capacitance that is connected between another end of the secondary winding and the center tap terminal; and
a rectifying and smoothing circuit that rectifies and smoothes a voltage generated across both ends of the third resonant capacitance and a voltage generated across both ends of the fourth resonant capacitance and outputs as the DC output voltage across the two DC output terminals.

(3) A power converter comprising:
two DC input terminals that input a DC input voltage;
two DC output terminals that output a DC output voltage;
an isolation transformer with a primary winding, a secondary winding, and an auxiliary winding;
a switch that is connected across the two DC input terminals in a state where the switch is connected in series to the primary winding and that switches the DC input voltage;
an LC resonance circuit that includes an inductance and a capacitance and is connected in parallel to the auxiliary winding;
a first resonant capacitance that is connected in parallel to the switch;
a second resonant capacitance that is connected in parallel to the secondary winding; and
a rectifying and smoothing circuit that rectifies and smoothes a voltage generated across both ends of the second resonant capacitance and outputs as the DC output voltage across the two DC output terminals.

(4) The power converter according to any one of (1) to (3), wherein the switch performs a Class E switching operation.

(5) The power converter according to any one of (1) to (4), wherein the LC resonance circuit is composed of a series circuit including an inductance and a capacitance.

(6) The power converter according to any one of (1) to (5), wherein frequency characteristics of an impedance when looking from both ends of the switch when the two DC input terminals are shorted are formed so as to include, in order from a low frequency band to a high frequency band, a first resonant frequency, a second resonant frequency, a third resonant frequency, a fourth resonant frequency, and a fifth resonant frequency, only the first resonant frequency and the second resonant frequency out of the five resonant frequencies are lower than a switching frequency of the switch, only the third resonant frequency is lower than a frequency that is double the switching frequency, the fourth resonant frequency is substantially equal to double the switching frequency, the fifth resonant frequency is higher than double the switching frequency, and the impedance has local maxima at the first resonant frequency, the third resonant frequency, and the fifth resonant frequency and has local minima at the second resonant frequency and the fourth resonant frequency.

(7) The power converter according to any one of (1) to (4),
wherein the LC resonance circuit has two series circuits that are each composed of an inductance and a capacitance and the two series circuits are connected in parallel.

(8) The power converter according to any one of (1) to (4) and (7),
wherein frequency characteristics of an impedance when looking from both ends of the switch when the two DC input terminals are shorted are formed so as to include, in order from a low frequency band to a high frequency band, a first resonant frequency, a second resonant frequency, a third resonant frequency, a fourth resonant frequency, a fifth resonant frequency, a sixth resonant frequency, and a seventh resonant frequency, only the first resonant frequency and the second resonant frequency out of the seven resonant frequencies are lower than a switching frequency of the switch, only the third resonant frequency is lower than a frequency that is double the switching frequency, the fourth resonant frequency is substantially equal to double the switching frequency, the fifth resonant frequency is higher than double the switching frequency and lower than four times the switching frequency, the sixth resonant frequency is substantially equal to four times the switching frequency, the seventh resonant frequency is higher than four times the switching frequency, and the impedance has local maxima at the first resonant frequency, the third resonant frequency, the fifth resonant frequency, and the seventh resonant frequency and has local minima at the second resonant frequency, the fourth resonant frequency, and the sixth resonant frequency.

What is claimed is:

1. A power converter comprising:
two direct current (DC) input terminals that input a DC input voltage;
two DC output terminals that output a DC output voltage;
an isolation transformer with a primary winding and a secondary winding;
a switch that is connected across the two DC input terminals in a state where the switch is connected in series to the primary winding and that switches the DC input voltage;
an LC resonance circuit that includes an inductance and a capacitance and is connected in parallel to the primary winding;
a first resonant capacitance that is connected in parallel to the switch;
a second resonant capacitance that is connected in parallel to the secondary winding; and
a rectifying and smoothing circuit that rectifies and smoothes a voltage generated across both ends of the second resonant capacitance and outputs as the DC output voltage across the two DC output terminals,
wherein frequency characteristics of an impedance when looking from both ends of the switch when the two DC input terminals are shorted are formed so as to include, in order from a low frequency band to a high frequency band, a first resonant frequency, a second resonant frequency, a third resonant frequency, a fourth resonant frequency, and a fifth resonant frequency, only the first resonant frequency and the second resonant frequency out of the five resonant frequencies are lower than a switching frequency of the switch, only the third resonant frequency is lower than a frequency that is double the switching frequency, the fourth resonant frequency is substantially equal to double the switching frequency, the fifth resonant frequency is higher than double the switching frequency, and the impedance has local maxima at the first resonant frequency, the third resonant frequency, and the fifth resonant frequency and has local minima at the second resonant frequency and the fourth resonant frequency.

2. The power converter according to claim 1,
wherein the switch performs a Class E switching operation.

3. The power converter according to claim 1,
wherein the LC resonance circuit is composed of a series circuit including the inductance and the capacitance.

4. The power converter according to claim 1,
wherein the LC resonance circuit has two series circuits that are each composed of the inductance and the capacitance and the two series circuits are connected in parallel.

5. The power converter according to claim 1,
wherein the frequency characteristics of the impedance when looking from both ends of the switch when the two DC input terminals are shorted are formed so as to further include, in order from the low frequency band to the high frequency band, the first resonant frequency, the second resonant frequency, the third resonant frequency, the fourth resonant frequency, the fifth resonant frequency, a sixth resonant frequency, and a seventh resonant frequency, the fifth resonant frequency is lower than four times the switching frequency, the sixth resonant frequency is substantially equal to four times the switching frequency, the seventh resonant frequency is higher than four times the switching frequency, and the impedance has additional local maxima at the seventh resonant frequency and has additional local minima at the sixth resonant frequency.

6. A power converter comprising:
two DC input terminals that input a DC input voltage;
two DC output terminals that output a DC output voltage;
an isolation transformer with a primary winding and a secondary winding that has a center tap terminal;
a switch that is connected across the two DC input terminals in a state where the switch is connected in series to the primary winding and that switches the DC input voltage;
an LC resonance circuit that includes an inductance and a capacitance and is connected in parallel to the primary winding;
a first resonant capacitance that is connected in parallel to the switch;
a third resonant capacitance that is connected between one end of the secondary winding and the center tap terminal;
a fourth resonant capacitance that is connected between another end of the secondary winding and the center tap terminal; and
a rectifying and smoothing circuit that rectifies and smoothes a voltage generated across both ends of the third resonant capacitance and a voltage generated across both ends of the fourth resonant capacitance and outputs as the DC output voltage across the two DC output terminals,
wherein frequency characteristics of an impedance when looking from both ends of the switch when the two DC input terminals are shorted are formed so as to include, in order from a low frequency band to a high frequency band, a first resonant frequency, a second resonant frequency, a third resonant frequency, a fourth resonant frequency, and a fifth resonant frequency, only the first resonant frequency and the second resonant frequency out of the five resonant frequencies are lower than a switching frequency of the switch, only the third resonant frequency is lower than a frequency that is double the switching frequency, the fourth resonant frequency is substantially equal to double the switching frequency, the fifth resonant frequency is higher than double the switching frequency, and the impedance has local maxima at the first resonant frequency, the third resonant frequency, and the fifth resonant frequency and has local minima at the second resonant frequency and the fourth resonant frequency.

7. The power converter according to claim 6,
wherein the switch performs a Class E switching operation.

8. The power converter according to claim 6,
wherein the LC resonance circuit is composed of a series circuit including the inductance and the capacitance.

9. The power converter according to claim 6,
wherein the LC resonance circuit has two series circuits that are each composed of the inductance and the capacitance and the two series circuits are connected in parallel.

10. The power converter according to claim 6,
wherein the frequency characteristics of the impedance when looking from both ends of the switch when the two DC input terminals are shorted are formed so as to further include, in order from the low frequency band to the high frequency band, the first resonant frequency, the second resonant frequency, the third resonant frequency, the fourth resonant frequency, the fifth resonant frequency, a sixth resonant frequency, and a seventh resonant frequency, the fifth resonant frequency is lower than four times the switching frequency, the sixth resonant frequency is substantially equal to four times the switching frequency, the seventh resonant frequency is higher than four times the switching frequency, and the impedance has additional local maxima at the seventh resonant frequency and has additional local minima at the sixth resonant frequency.

11. A power converter comprising:
two DC input terminals that input a DC input voltage;
two DC output terminals that output a DC output voltage;
an isolation transformer with a primary winding, a secondary winding, and an auxiliary winding;
a switch that is connected across the two DC input terminals in a state where the switch is connected in series to the primary winding and that switches the DC input voltage;
an LC resonance circuit that includes an inductance and a capacitance and is connected in parallel to the auxiliary winding;
a first resonant capacitance that is connected in parallel to the switch;
a second resonant capacitance that is connected in parallel to the secondary winding; and
a rectifying and smoothing circuit that rectifies and smoothes a voltage generated across both ends of the second resonant capacitance and outputs as the DC output voltage across the two DC output terminals,
wherein frequency characteristics of an impedance when looking from both ends of the switch when the two DC input terminals are shorted are formed so as to include, in order from a low frequency band to a high frequency band, a first resonant frequency, a second resonant frequency, a third resonant frequency, a fourth resonant frequency, and a fifth resonant frequency, only the first resonant frequency and the second resonant frequency out of the five resonant frequencies are lower than a switching frequency of the switch, only the third resonant frequency is lower than a frequency that is double the switching frequency, the fourth resonant frequency is substantially equal to double the switching frequency, the fifth resonant frequency is higher than double the switching frequency, and the impedance has local maxima at the first resonant frequency, the third resonant frequency, and the fifth resonant frequency and has local minima at the second resonant frequency and the fourth resonant frequency.

12. The power converter according to claim 11,
wherein the switch performs a Class E switching operation.

13. The power converter according to claim 11,
wherein the LC resonance circuit is composed of a series circuit including the inductance and the capacitance.

14. The power converter according to claim 11,
wherein the LC resonance circuit has two series circuits that are each composed of the inductance and the capacitance and the two series circuits are connected in parallel.

15. The power converter according to claim 11,
wherein the frequency characteristics of the impedance when looking from both ends of the switch when the two DC input terminals are shorted are formed so as to further include, in order from the low frequency band to the high frequency band, the first resonant frequency, the second resonant frequency, the third resonant frequency, the fourth resonant frequency, the fifth resonant frequency, a sixth resonant frequency, and a seventh resonant frequency, the fifth resonant frequency is lower than four times the switching frequency, the sixth resonant frequency is substantially equal to four times the switching frequency, the seventh resonant frequency is higher than four times the switching frequency, and the impedance has additional local maxima at the seventh resonant frequency and has additional local minima at the sixth resonant frequency.

\* \* \* \* \*